G. H. GILMAN.
PRESSURE ACTUATED TOOL.
APPLICATION FILED NOV. 13, 1908.
1,143,533.
Patented June 15, 1915.
3 SHEETS—SHEET 1.
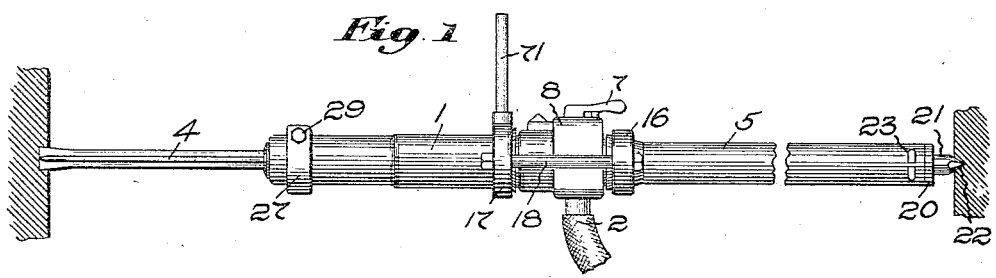
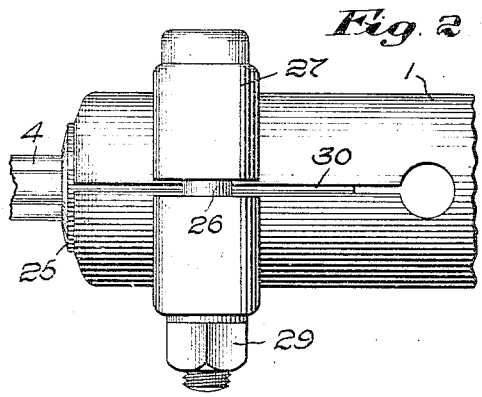
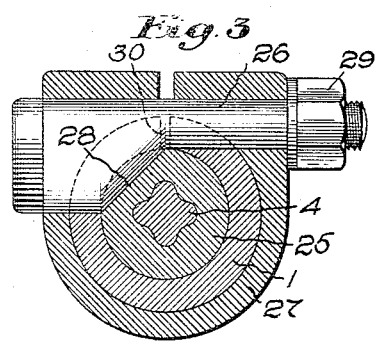
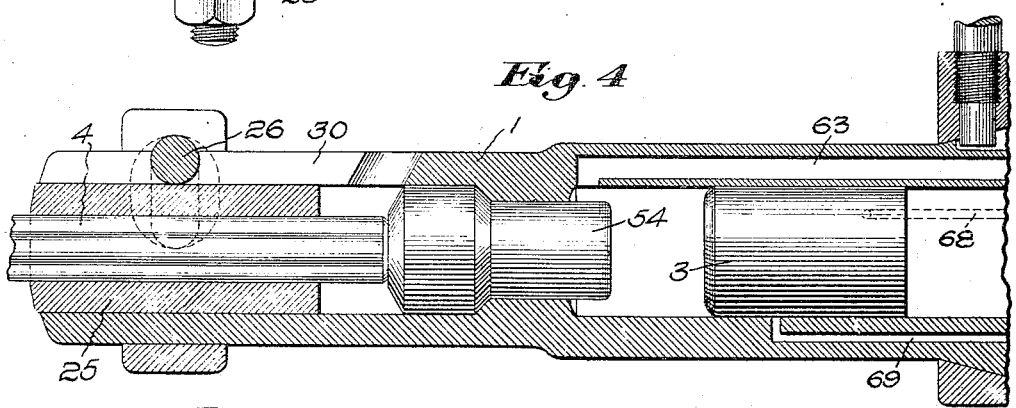
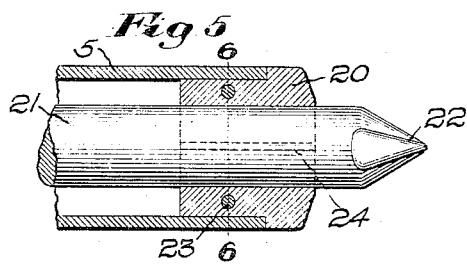
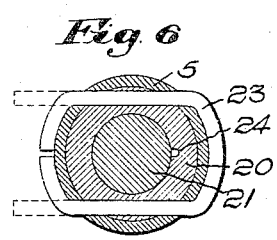
Witnesses:
Horace H. Crossman
Robert H. Kammler.
Inventor:
George H. Gilman.
by Emery Booth
Att'ys G. H. GILMAN.
PRESSURE ACTUATED TOOL.
APPLICATION FILED NOV. 13, 1908.
1,143,533.
Patented June 15, 1915.
3 SHEETS—SHEET 2.
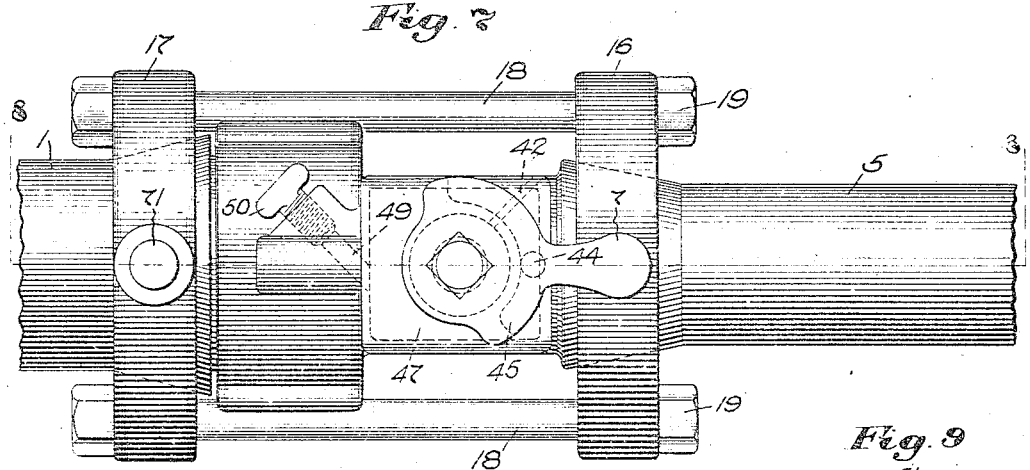
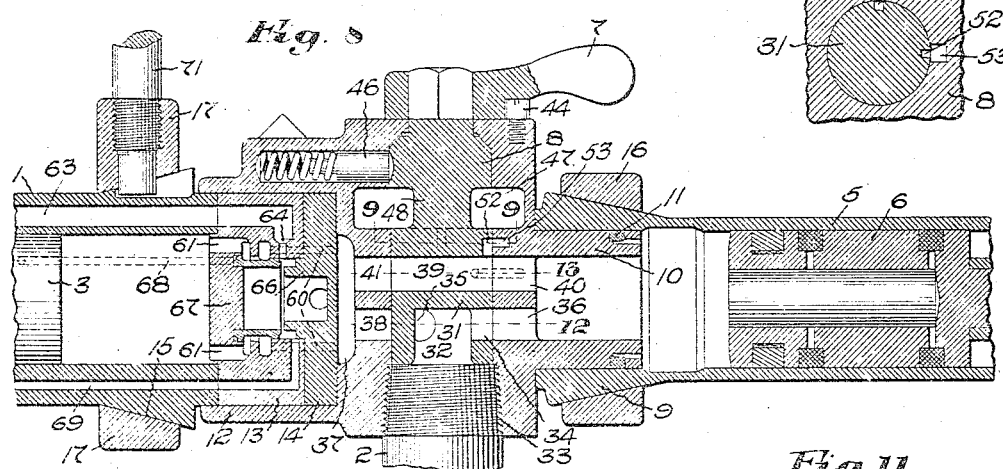
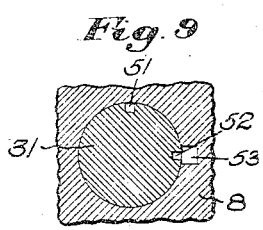
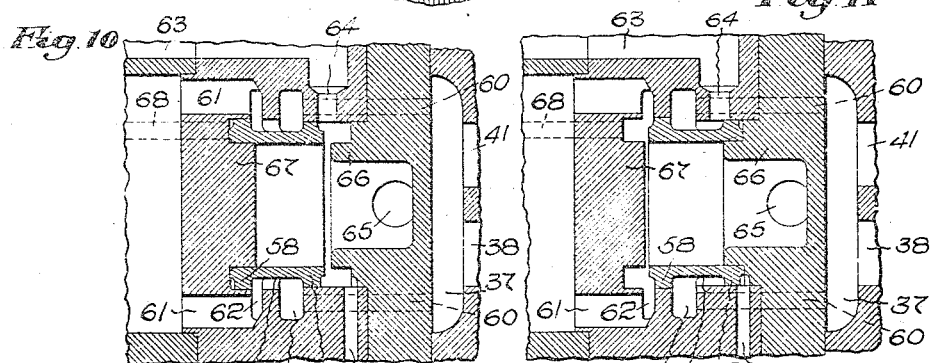
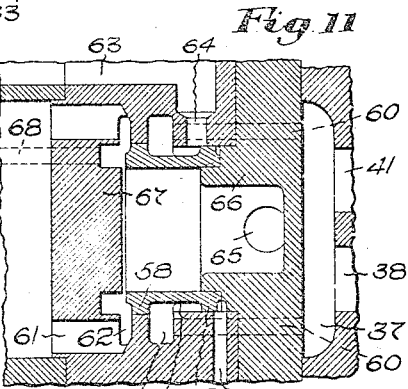
Witnesses:
Horace H. Crossman
Robert H. Kammler
Inventor:
George H. Gilman
by Emery, Booth
Attys.

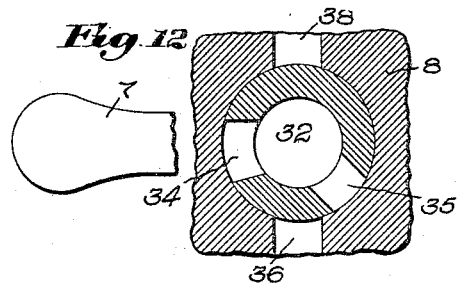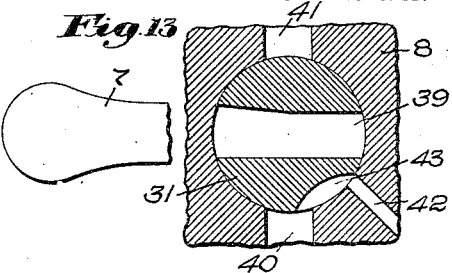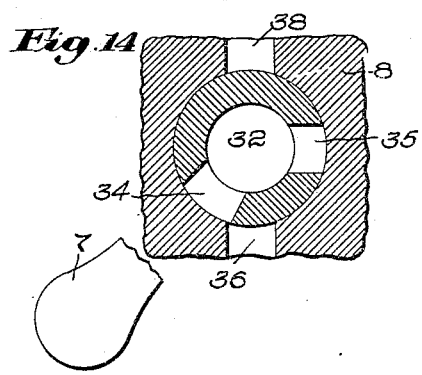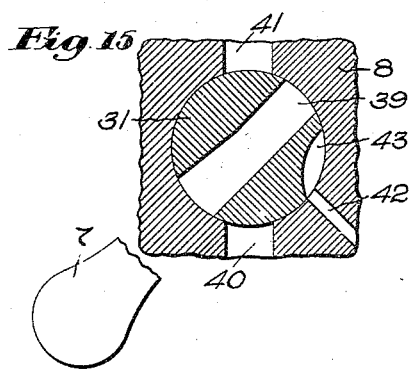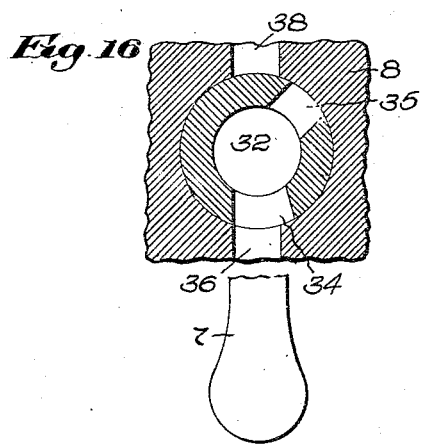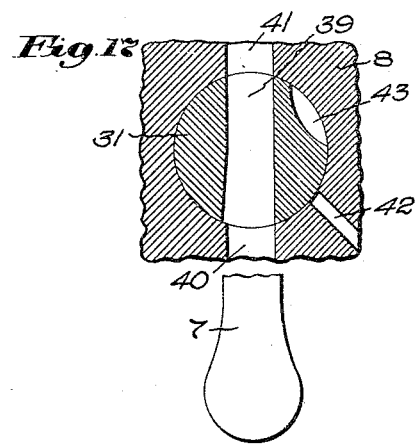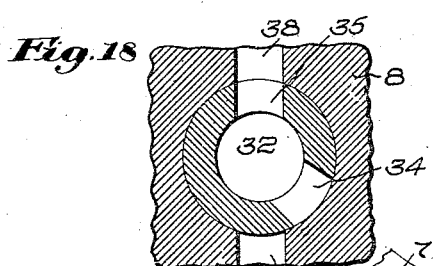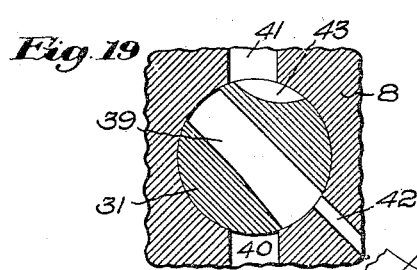

UNITED STATES PATENT OFFICE.

GEORGE H. GILMAN, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

PRESSURE-ACTUATED TOOL.

1,143,533.

Specification of Letters Patent.

Patented June 15, 1915.

Application filed November 13, 1908. Serial No. 462,402.

*To all whom it may concern:*

Be it known that I, GEORGE H. GILMAN, a citizen of the United States, and residing at Claremont, county of Sullivan, and State of New Hampshire, have invented an Improvement in Pressure-Actuated Tools, of which the following description, in connection with the accompanying drawings, is a specification, like letters on the drawings representing like parts.

My invention relates to pressure-actuated tools being more particularly concerned with the provision of improved feeding devices for such tools and with improvements in the pressure-actuated controlling valves for the tools themselves.

My invention will be best understood by reference to the following description when taken in connection with the accompanying illustration of one specific embodiment thereof, while its scope will be more particularly pointed out in the appended claims.

In the drawings: Figure 1 shows in side elevation, partly broken away, a pressure-fed hammer drill embodying one form of my invention; Fig. 2 shows in plan a detail, on an enlarged scale, of the clamp for the tool bushing; Fig. 3 is a transverse section in elevation taken on the line 3—3 in Fig. 2; Fig. 4 shows a central, longitudinal section in elevation of the forward end of the hammer drill cylinder together with the tool bushing and clamp; Fig. 5 is a central, sectional elevation of a portion of the supporting or abutting end of the feed cylinder; Fig. 6 is a sectional elevation on the line 6—6 in Fig. 5; Fig. 7 is a plan, on an enlarged scale, of the head block and its connections to the tool and feed cylinders; Fig. 8 is a longitudinal section in elevation of the same taken on the line 8—8 in Fig. 7; Fig. 9 is a section in plan on the line 9—9 in Fig. 8 showing the oiling passages; Fig. 10 is a section, on an enlarged scale, showing the controlling valve for the hammer drill; Fig. 11 is a similar section showing the valve in another position; Fig. 12 is a section in plan on the line 12—12 in Fig. 8, showing the relation of the motive fluid passages when the throttle valve is wholly shut off; Fig. 13 is a similar section on the line 13—13 in Fig. 8 and showing the same position of the throttle valve; Figs. 14 and 15 are sections similar to Figs. 12 and 13, respectively, but showing the relation of the motive fluid passages when the valve has been turned initially to admit fluid to the feeding cylinder while still shutting off from the tool; Figs. 16 and 17 are sections similar to Figs. 12 and 13, respectively, showing the relation of the fluid passages when the valve has been turned to admit fluid both to the feeding cylinder and the tool; and Figs. 18 and 19 are sections similar to Figs. 12 and 13, respectively, showing the relation of the same passages when the valve has been turned to shut off the pressure fluid from the feed cylinder while still admitting it to the tool.

Referring to the drawings and to the embodiment of my invention which I have there disclosed for illustrative purposes, I have there shown a pneumatic tool, herein of the hammer drill type, having the cylinder 1 so connected to suitable pressure-actuated feeding apparatus that the pressure fluid supplied thereto through the pipe 2 acts not only reciprocatively to move the hammer piston 3 against the shank of the cutter bit or drill 4, but also acts initially to advance the tool toward the work and hold the drill forcibly pressed against the same while the tool is in operation, all as represented in Fig. 1.

While pressure-actuated feeding means of any suitable construction may be employed, herein I have provided a feeding cylinder 5 adapted to coöperate with a suitable feeding piston 6 (see Fig. 8) therein contained. Either the piston or the cylinder, as desired, may be connected to the tool, the remaining part serving to support the apparatus either by abutment against a wall or other support (as represented in Fig. 1), or by direct attachment to some suitable support. In the present instance the piston 6 serves as the abutting or supporting member, the cylinder being rigidly secured to the tool to move therewith on the support which is provided by the fixed piston.

In the present form of apparatus the pressure fluid for actuating the feed and the tool is controlled through a throttle valve, the handle for which is represented at 7, such valve being mounted in the connecting piece 8 interposed between and rigidly secured to the feed cylinder 5 and the tool cylinder 1.

In devices of this class great trouble has been experienced from the employment of threaded joints for securing the feed and tool parts together and difficulty has been found in providing an attachment suitable for holding the parts securely together while capable of withstanding the severe vibratory strains to which they are subjected when used in the mine.

In the present construction I have provided accurately fitting slip joints between the feed cylinder and the connecting piece on the one side and the tool cylinder and connecting piece on the other, and have also provided means for clamping such parts securely together without the use of threaded joints between the parts, and preferably through the employment of tapered or conical clamping means.

Referring more particularly to the construction shown in Figs. 7 and 8, the forward or inner end of the feed cylinder is provided with outwardly flared tapering walls 9, and the same is fitted over a reduced projecting portion 10 of the connecting piece, a packing ring 11 being preferably employed to make the slip joint thus provided pressure tight. At the opposite or forward end of the connecting piece there is provided the shell 12 fitted about and slipped over the valve block 13 and its end plate 14 and also over a short end portion of the cylinder 1. The latter, closely adjacent the shell portion of the connecting piece 8 is also provided with tapered walls 15, similar to the tapered portion 9 on the feed cylinder, but reversely arranged. With the parts in the position shown they are all clamped rigidly together by means of the clamping collars 16 and 17, which latter have tapered openings to fit over the tapered walls of the feed cylinder and tool cylinder, respectively, and are united and clamped together by means of the tie bolts 18 and the clamping nuts 19, the bolts passing through lateral ears on the clamping collar. This provides a perfectly rigid connection for the feed cylinder, tool cylinder and the intervening connecting piece without the use of threaded joints, and affords a connection capable of holding together under the most severe usage.

Referring now to Figs. 1, 5 and 6, at the opposite or supporting end of the feed cylinder, provision is made for a plug or guiding piece for the piston rod inserted in the end of the cylinder and there retained without the use of threaded joints or threaded connections. While this may be effected in various ways, in the present instance there is provided a plug 20 provided with a head and having a reduced portion fitting the end of the cylinder into which it is stepped. The plug not only closes the end of the cylinder but provides a guide for the end of the piston rod 21, which latter terminates in the foot or pivoted end 22 adapted to abut against a fixed support, such as the wall shown in Fig. 1.

In assembling the apparatus the plug is inserted and a U-shaped retaining device is then driven into suitably drilled transverse holes in the walls of the cylinder and of the plug. The projecting ends of the retaining member (represented in dotted line, Fig. 6) are then bent over against the cylinder, as there shown, thus effectually locking the piece against displacement no matter how great the vibration may be to which the apparatus is subjected. On the other hand, if it is desired to dismantle the apparatus, or remove the piston for any purpose, the plug may be withdrawn by straightening out the ends of the insertion member or key and withdrawing the latter to release the plug. Preferably means are provided, such as the relief passage 24 for connecting the rearward end of the feed cylinder with the atmosphere.

In the cylinder the shank of the drill 4 preferably passes through a suitable bushing 25, the latter having a bore conforming to the cross-section of the drill so as to prevent rotative movement thereof, while permitting its longitudinal movement.

To prevent either rotative or longitudinal displacement of the bushing the latter is held fixed in the end of the cylinder by a key bolt 26 lying transversely across the bushing. The key is carried in the split clamping piece 27, which is adapted to be slipped over the end of the cylinder and clamped into position by the key. The walls of the cylinder are transversely cut away to receive the key, and the latter is provided with an inclined bushing engaging wall 28 adapted to seat in a corespondingly shaped groove or recess in the bushing, so that, when the bolt is clamped up the key seats in the bushing recess and the bushing is locked rigidly against displacement of any kind within the cylinder. By unloosening the clamping nut 29 the key may be moved laterally far enough to permit the removal of the bushing without the withdrawal of the key from the cylinder. Preferably, though not necessarily, the cylinder is split as at 30 for a short distance from its end, so that the bushing can be slipped freely in and out of the cylinder, while, at the same time, it may be clamped tightly within the cylinder when the clamping nut 29 is tightened.

Referring now to the throttle valve which coördinately controls the pressure feed and the tool, such valve is designated by the numeral 31 (Fig. 8) and is arranged transversely the connecting piece 8, being provided with pasages so arranged that it acts to secure a variety of coöperative actions in the tool and the feed.

To supply motive fluid to the valve, the end of the latter has the central opening or supply chamber 32 at all times in communication with the fluid supply, the feed pipe for the latter having attachment to the adjacent opening 33 in the connecting piece 8. From the valve supply chamber 32 there are provided two lateral or transverse exit passages 34 and 35, the former adapted to admit fluid to the feed cylinder through the main feed cylinder entrance passage 36 when the apparatus is in operation, and the other passage acting, under certain conditions of operation, to admit fluid to the pressure chamber 37 of the tool through an auxiliary tool supply passage 38. Beyond the limits of the central chamber 32 the throttle valve is also provided with a transverse passage 39 extending diametrically across the valve and, in the normal operation of the tool, acting to connect the feed cylinder with the pressure chamber 37 of the tool by registration with the cylinder exit passage 40 on the one side and the main tool supply passage 41 on the other. Means are also provided for placing the feed cylinder in communication with the atmosphere, such means herein comprising a duct or passage 42 extending laterally through the walls of the connecting piece 8 surrounding the throttle valve and adapted to be placed in communication with the feed cylinder exit passage 40 in certain positions of the valve by means of a groove or pocket 43 in the side of the throttle, such pocket being shown in Fig. 13.

Referring now to Figs. 12 to 19 inclusive, the movement of the throttle valve for controlling the apparatus will now be explained. When the tool is out of use, the throttle is turned to the position shown in Figs. 12 and 13, pressure fluid in the supply chamber 32 of the valve being then shut off from access to the feed cylinder. At the same time the latter is opened to the atmosphere through the exit passage 40, the valve groove 43 and atmospheric passage 42, so that the feeding attachment is ineffective for imparting any feeding movement to the tool. At the same time the tool is shut off from the pressure fluid, both the main supply passage 41 and the auxiliary passage 38 being closed by the throttle valve. The tool may be left in this condition while out of use, or transported from place to place or set up preparatory to use.

In setting up the apparatus preparatory to drilling, it is desirable to advance the tool with its cutting bit gradually toward the work so as accurately to position the drill at the spot where the drilling is to take place and then, with full feeding pressure maintained, to start the hammer lightly in operation to "spot" the sole by drilling a sufficient depth to insure the centering of the drill before the full pressure is turned on to the tool.

In Figs. 14 and 15 I have shown the position to which the throttle is turned for admitting the initial pressure to the feed piston to position the drill. With the valve turned to this position, the passage 36 has just begun to open into the passage 34, thereby admitting a restricted amount of pressure fluid to advance the tool and the cutter gradually against the work. Before this occurs the atmospheric passage 42 has been shut off from the cylinder exit passage 40, while the pressure, as before, still remains cut off from the tool.

With the drill positioned against the work, the valve may be then gradually moved from the position shown in Figs. 14 and 15 to that shown in Figs. 16 and 17, which shows the passage arrangement with the tool operating under full power. In bringing the valve to this position, the operative will ordinarily dwell it at the point of initial fluid admission to the tool sufficiently to insure the "spotting" action referred to. In the full-open position of the valve shown in Figs. 16 and 17, pressure fluid is being admitted through the central opening 32 and the passages 34 and 36 to the feed cylinder and thence, through the cylinder exit passage 40 and the transverse valve passage 39 to the main tool inlet port 41 and the pressure chamber of the tool. It will be seen that, under these conditions, the valve may be slightly moved to give either a full supply of motive fluid to the tool (as shown) or a reduced supply throttled down to any desired extent.

In the use of apparatus of this type it is frequently desirable to cut off the supply of motive fluid to the feed cylinder for the purpose of reducing the force of the feed, while still continuing the operation of the tool. For example, in drilling hard rock pockets or other formations are frequently encountered which suddenly withdraw opposition to the advance of the cutting bit and, if the full feeding pressure is at that time effective, the tool with its bit will spring forward until the hard rock is again encountered, frequently binding or cramping the bit into some position from which it must be extracted with considerable labor before the drilling can proceed. To provide for this or other contingencies, I have shown means for diminishing the feeding effort at times to any required amount so that, when pockets or other like conditions are encountered, such means may be availed of. In the described form of throttle valve, the passages are so arranged that, by turning the throttle to the position shown in Figs. 18 and 19 motive fluid may be admitted directly to the pressure chamber of the tool from the supply chamber 32 through the lateral passage 35 and the auxiliary passage 36, thereby maintaining the full operation of the tool while shutting off the feed cylinder from the pressure fluid as well as the atmosphere. This results in bottling up or trapping the pressure fluid remaining in the feed cylinder, the effectiveness of which fluid, however, quickly drops in the event of expansion occasioned by any sudden advance of the tool. If it is desired further to diminish the pressure of the fluid thus trapped in the feed cylinder, the throttle valve may be moved slightly back in the direction of the arrow shown in Fig. 19, thereby connecting the feed cylinder with the atmosphere through the passages 40 and 42, and lowering the pressure therein to any desired degree. In passing from the position shown in Fig. 17 to that shown in Fig. 19, these atmospheric passages are momentarily placed in communication, but the interval is so slight, unless purposely maintained, as to be of no effect in lowering the pressure of the fluid trapped in the feed. It will therefore be seen that the throttle valve may be moved to a variety of positions for the purposes described, thereby effecting complete control over the feed and the tool.

Preferably means are provided such as the stud 44 fixed in the upper face of the connecting piece 8 and coöperating with the groove 45 in the under face of the handle 7 to limit the throttle valve to a range of movement sufficient only to give the desired connections.

In order to position the valve in the various positions to which it will customarily be turned, while, at the same time, permitting graduated movement thereof, any suitable means may be provided, but herein there is shown the spring-pressed positioning pin 46 working in a lateral pocket in the connecting piece 8 and pressed against the outer walls of the throttle valve, which latter is provided with a plurality of depressions adapted to receive the end of the pin. The end of the latter is rounded so that it yields readily to the movement of the throttle, but when one of the openings of the latter is brought into registration with the pin the latter slips into the opening and helps position the throttle and there hold the same against accidental displacement.

The proper lubrication of a device of this class is often a matter of difficulty and, here shown in connection with the described invention, I have provided lubrication means preferably coöperating with the controlling throttle valve. For this purpose there is herein provided an annular lubricant chamber 47 in the connecting piece, such chamber surrounding the reduced portion 48 of the throttle valve stem. Such chamber is adapted to be filled with lubricant through the passage 49 (Fig. 7), the latter being closed by the threaded plug 50.

To feed the lubricant from the lubricant chamber to the tool in restricted quantities, but so that some lubrication will always be assured when the tool is started into operation, the throttle valve is provided with two grooves or recesses 51 and 52 of suitable size formed longitudinally in the periphery of the valve. The groove 51 opens into the lubricant chamber and, when the valve is turned to the inoperative position shown in Figs. 12 and 13, connects such chamber with a small oil retaining pocket 53 formed in the opposing walls of the connecting piece and causes the filling of such pocket with lubricant. When the valve is subsequently turned to start the apparatus into operation, this lubricant is trapped in the pocket 53.

When the valve reaches the position shown in Figs. 16 and 17 the groove 52 is brought into registration with the oil pocket. The groove 52 opens into the valve passage 39, through which the pressure fluid passes to the tool, so that such lubricant is then released and carried over by the motive fluid passing through the passage 39 across the open mouth of the groove 52.

Each time that the valve is turned to the inoperative position the oil pocket is again filled and, when the tool is started into operation, the lubricant retained thereby is carried into the working parts of the tool. This insures lubrication of the tool without waste of lubricant and without attention on the part of the operator save to maintain a supply of lubricant in the chamber 47.

Referring now to the construction of the tool and more particularly to that of the controlling valve therefor, attention is directed to the construction shown in Figs. 4, 8, 10 and 11. It will there be seen that the piston hammer 3 is in the form of a straight ungrooved cylindrical bolt, which delivers its blows against an anvil member 54 interposed between the drill shank 4 and the piston. Movements of the piston are directed by means of the pressure-actuated controlling valve 55 preferably in the form of a cylindrical shell and working in a valve chamber formed between the valve block 13 and the end plate 14.

The valve is preferably in the form of a hollow spool having a central circumferential groove 56 and provided with heads or end portions 57 and 58, of which the latter is preferably of slightly greater diameter. The valve chamber has a bore of two diameters corresponding to the diameters of the valve, and the end portions thereof present to the ends of the valve chamber differential pressure areas which are effective in producing the valve movements about to be described.

To admit motive fluid to the valve chamber, the latter, near its mid-portion, is provided with an annular groove 59 preferably at all times, in communication with the circumferential groove 56. To such annular groove there is constantly admitted motive fluid through the longitudinal passages 60 which extend rearwardly through the valve block and end plate to the constant pressure chamber 13.

To admit motive fluid to and exhaust the same from the rear or working end of the tool cylinder, the latter is connected, herein by a plurality of rearwardly extending passages 61 with a cylinder port in the valve chamber, herein in the form of an annular groove 62 located at the front of the annular groove 59.

To admit motive fluid to and exhaust the same from the forward or tool end of the cylinder, the forward end of the latter (Fig. 4) has opening into the same a return pressure port 63 extending longitudinally through the cylinder walls and the valve block (Fig. 8) opening into the valve chamber through the transverse port 64, which latter is located immediately at the rear of the annular groove 59.

It will therefore be seen that, with the valve in the forward position shown in Fig. 10, the annular groove 59 is connected with the rear end of the tool cylinder, and, in the position shown in Fig. 11, with the forward end thereof, pressure being admitted in the first case to drive the piston forward to impart the striking blow and, in the latter case, to return the piston rearwardly.

For the exhaust there is provided the lateral exhaust passage 65 opening into the atmosphere through the valve block plate on the surrounding shell 12 of the connecting member and placing the hollow interior of the valve in communication at all times with the atmosphere.

The plate 14 and the valve block are provided with projecting wall portions 66 and 67, respectively, which fit the interior diameter of the valve and over which the valve is adapted alternately to slide, acting, in the forward position, to uncover the projection 66 and open the rear of the valve chamber to the interior of the valve and, in the rearward position to uncover the projection 67 and open the forward end of the valve chamber to the interior of the valve. The proportions are such that, in the forward position the hollow interior of the valve and, therefore, the atmosphere, is connected directly with the port 64 and thereby with the forward end of the tool cylinder, while, in the rearward position, the valve interior is connected through the annular groove 62 and passage 61 with the rear end of the cylinder.

Any suitable means may be employed for effecting pressure-actuated movement of the valve, but herein passages are provided opening into the opposite ends of the valve chamber and communicating with the tool cylinder at different points in its length. One passage 68 communicates at one end with the forward end of the valve chamber (see Figs. 8 and 11) and at the opposite end with the tool cylinder (see Fig. 4) in such a position as to be uncovered to the motive fluid at any suitable time prior to the time the piston strikes its blow. This causes motive fluid to be admitted to the larger or forward area of the valve, moving the latter from the position shown in Fig. 10 to that shown in Fig. 11. In addition there is also provided a second valve-actuating passage 69, opening at one end through a transverse port 70 into the rear end of the valve chamber, and at its forward end into the tool cylinder at a point in advance of the passage 68 and where it will be uncovered to the motive fluid by the piston on the return movement of the latter. At such time the valve being in the position shown in Fig. 11, the larger end pressure area is exposed to the exhaust, while the motive fluid admitted through the passage 69 and the port 70 to the smaller end pressure area, acts to move the valve from the position shown in Fig. 11 to that shown in Fig. 10.

From the foregoing description of the construction of the valve and the arrangement of its various ports and passages, its operation will be clear. With motive fluid admitted to the constant pressure chamber 13 and the valve shown in the position in Fig. 10, fluid is admitted to the rear end of the tool cylinder to drive the piston forward through the longitudinal passages 60, the annular groove 59 in the valve chamber, the circumferential groove 56, the annular groove 62 and the cylinder admission passages 61. At the same time fluid is exhausted from the forward end of the tool cylinder through the return pressure port 63, the valve chamber port 64, the hollow interior of the valve and the exhaust passage 65.

When the valve has reached a position sufficiently advanced to uncover the valve controlling port 68, motive fluid is admitted to the forward end of the valve chamber and against the larger area of the valve, acting to reverse the latter and move it to the position shown in Fig. 11. In this position of the valve, pressure fluid is admitted to the forward end of the tool cylinder from the constant pressure chamber 13 through the longitudinal passage 60, the annular groove 59 of the valve chamber, the circumferential valve groove 56, the port 64 and the return pressure port 63. At the same time fluid is exhausted from the rear end of the tool cylinder through the cylinder port 61, annular groove 62, the hollow interior of the valve and the exhaust port 65.

During the operation of the tool and with the drill pressed against the work by the pressure feed, as represented in Fig. 1, means are preferably employed, as usual, to oscillate or rotate the tool. Herein the tool rotation is effected by means of the radial handle piece 71 threaded into the clamping collar 17. By turning the radial member 71, the tool, together with the entire feeding apparatus, may be oscillated or rotated sufficiently to impart the necessary turning movement to the tool.

While I have herein shown and described for the purpose of illustration one concrete form or embodiment of my invention, it is to be understood that the same is not limited to the details of construction, or relative form or arrangement of parts, or to the application herein made of the various features thereof, but that the same may be modified within wide limits without departing from the spirit of the invention.

Having thus described my invention, what I claim is:

1. In a tool feeding device, the combination with a pressure-actuated tool, of a pressure-actuated feeding device therefor, a throttle valve and means permitting said valve to be placed in one position to open the feeding device to the motive fluid while cutting off motive fluid from the tool, and in another position to open the tool to the motive fluid while cutting off motive fluid from the feeding device and means to enforce the occurrence of the enumerated operations in the order named and in reverse order.

2. In a tool feeding device, the combination with a pressure-actuated tool, of a pressure-actuated feeding device therefor, a throttle valve and means permitting the latter to be placed in one position to connect both the tool and the feeding device with the pressure fluid, and in another position to cut off the pressure fluid from the feeding device while trapping a portion thereof therein, and, at the same time, leaving the tool open to the pressure fluid and means to enforce the occurrence of the enumerated operations in the order named and in reverse order.

3. In a tool feeding device, the combination with a pressure-actuated tool, of a pressure-actuated feeding device, a throttle valve, and means permitting said valve to be placed in one position to open the feeding device to the pressure fluid and in another position to trap a portion of the motive fluid therein while admitting motive fluid to the tool to cause the operation thereof, said valve also being adapted for movement to exhaust more or less of the motive fluid thus trapped in the feeding device.

4. In a tool feeding device, the combination with a pressure-actuated tool, of a pressure-actuated feeding device, and means for initiating the operation of said tool and feeding device and subsequently causing the operation of the feeding device on pressure fluid stored therein, while continuing the pressure-actuated operation of the tool.

5. In a tool feeding device, the combination with a pressure-actuated tool, of a pressure-actuated feeding device, means for causing the operation of the feeding device on pressure fluid stored therein, while continuing the pressure-actuated operation of the tool, and means for adjustably exhausting more or less of the pressure fluid stored in the feeding device to vary the feeding effort thereof.

6. In a tool feeding device, the combination with a pressure-actuated tool, of a pressure-actuated feeding device, a throttle valve, and means permitting the latter to be placed in one position to cut off motive fluid from both the tool and the feeding device while opening the latter to the atmosphere, in another position to admit motive fluid to the feeding device while cutting it off from the tool, in a third position to admit fluid both to the tool and the feeding device, and in a fourth position, while still continuing to admit fluid to the tool, to cut off motive fluid from the feeding device for operating the latter on the pressure trapped therein.

7. In a mechanism of the character set forth, the combination with a motor of motive fluid operative means for feeding the motor to its work, means for delivering the motive fluid to the feed means and conducting it therefrom to the motor, to initiate the operation of the latter and means for causing the operation of the feeding means on pressure fluid stored therein while continuing the pressure-actuated operation of the motor.

8. In a tool feeding device, the combination with a pressure-fluid actuated tool, of a pressure-fluid actuated feeding device therefor, a throttle valve, and means permitting said valve to be placed in one position to cut off motive fluid to the tool and feeding device, while placing the latter in communication with the atmosphere, in another position to open the feeding device to the motive fluid while cutting off motive fluid from the tool, and in still another position to open the tool to the motive fluid while cutting off motive fluid from the feeding device and means to enforce the occurrence of the enumerated operations in the order named and in reverse order.

9. In a tool feeding device, the combination with a pressure fluid actuated tool, of a pressure-fluid actuated feeding device therefor, a swiveled throttle valve and means coöperating therewith having provision for causing a continuous movement of said throttle valve in one direction, first, to supply motive fluid to the feeding device while withholding motive fluid from the tool, second, to supply motive fluid to both the feeding device and the tool, and, third, to cut off the supply of motive fluid to the feeding device while still continuing to supply motive fluid to the tool, and means to limit the turning movement of said valve to less than three hundred and sixty degrees.

10. In a tool feeding device, the combination with a pressure fluid actuated tool, of a pressure fluid actuated feeding device therefor, a swiveled throttle valve and means coöperating therewith having provision for causing a continuous movement of said throttle valve in one direction, first, to supply motive fluid to the feeding device while withholding motive fluid from the tool, second, to supply motive fluid to both the feeding device and the tool, and, third, to cut off the supply of motive fluid to the feeding device while still continuing to supply motive fluid to the tool, all within a turning movement of less than two hundred and seventy degrees.

11. In a tool feeding device, the combination with a pressure fluid actuated tool, of a pressure fluid actuated feeding device therefor, a swiveled throttle valve and means coöperating therewith having provision for causing a continuous movement of said throttle valve in one direction, first, to supply motive fluid to the feeding device while withholding motive fluid from the tool, second, to supply motive fluid to both the feeding device and the tool, and third, to cut off the supply of motive fluid to the feeding device while still continuing to supply motive fluid to the tool, all within a turning movement of less than one hundred and eighty degrees.

12. In a tool feeding device, the combination with a pressure fluid actuated tool, of a pressure fluid actuated feeding device therefor, a swiveled throttle valve and means coöperating therewith having provision for causing a continuous movement of said throttle valve in one direction, first, to supply motive fluid to the feeding device while withholding motive fluid from the tool, second, to supply motive fluid to both the feeding device and the tool, and third, to cut off the supply of motive fluid to the feeding device while still continuing to supply motive fluid to the tool, and means to limit the turning movement of the valve to less than one hundred and eighty degrees.

13. In a tool feeding device, the combination with a pressure fluid actuated tool, of a pressure fluid actuated feeding device therefor, a throttle valve and means coöperating therewith having provision for causing a continuous movement of said throttle valve in one direction, first, to supply motive fluid to the feeding device while withholding motive fluid from the tool, second, to supply motive fluid to both the feeding device and the tool, and third, to cut off the supply of motive fluid to the feeding device while still continuing to supply motive fluid to the tool, and means for enforcing the occurrence of the enumerated operations in the order named or in reverse order.

14. In a tool feeding device, the combination with a pressure fluid actuated tool, of a pressure fluid actuated feeding device therefor, a throttle valve and means coöperating therewith for causing a continuous movement of said valve in one direction first, to supply motive fluid to the feeding device while withholding motive fluid from the tool, and second, to supply motive fluid to both the feeding device and the tool, and means for enforcing the occurrence of the enumerated operations in the order named and in reverse order.

In testimony whereof, I have signed my name to this specification, in the presence of two subscribing witnesses.

GEORGE H. GILMAN.

Witnesses:
W. P. J. DINSMOOR,
S. BOWLES KING.